United States Patent [19]

Abe et al.

[11] 4,354,017

[45] Oct. 12, 1982

[54] PROCESS FOR THE PRODUCTION OF POLYQUINAZOLONE-BASED POLYMERS

[75] Inventors: Masao Abe; Hisashi Ichinose; Yuzuru Noda, all of Ibaraki, Japan

[73] Assignee: Nitto Electric Industrial Co., Ltd., Osaka, Japan

[21] Appl. No.: 277,429

[22] Filed: Jun. 25, 1981

[30] Foreign Application Priority Data

Jun. 26, 1980 [JP] Japan .................................. 55/86794

[51] Int. Cl.$^3$ ....................... C08G 69/40; C08G 69/12
[52] U.S. Cl. .................................... 528/172; 528/180; 528/207; 528/208; 528/223; 528/225; 528/229; 528/313; 528/319; 528/327
[58] Field of Search ............... 528/172, 180, 207, 208, 528/223, 225, 229, 313, 319, 327

[56] References Cited

U.S. PATENT DOCUMENTS

| | | | |
|---|---|---|---|
| 3,408,326 | 10/1968 | Errede | 260/47 |
| 3,444,136 | 5/1969 | Belohlav et al. | 260/47 |
| 3,541,054 | 11/1970 | Takekoshi | 260/78 |

FOREIGN PATENT DOCUMENTS 1423631 11/1966 France .

*Primary Examiner*—Earl A. Nielsen
*Attorney, Agent, or Firm*—Sughrue, Mion, Zinn, Macpeak & Seas

[57] ABSTRACT

A process for the production of polyquinazolone-based polymers by reacting bisquinazolone with a diamine or a diamine substituted with a carboxylic acid, sulfonic acid or metal salt thereof in the presence of a Lewis acid catalyst or a phosphorus-containing dehydrating agent, where the polymers are useful to produce permselective membranes.

16 Claims, No Drawings

PROCESS FOR THE PRODUCTION OF POLYQUINAZOLONE-BASED POLYMERS

FIELD OF THE INVENTION

The present invention relates to a process for the production of polyquinazolone-based polymers.

BACKGROUND OF THE INVENTION

Polyquinazolone-based polymers are known to have particularly excellent chlorine resistance and alkali resistance and to show high resistance against various organic solvents and chemicals. Therefore, they can be formed into permselective membranes which are suitable for use in the membrane-separation of not only aqueous liquids but also non-aqueous liquids, such as ultrafiltration membranes and reverse osmosis membranes (see, for example, Japanese Patent Application No. 130214/79 corresponding to U.S. Patent Application Ser. No. 195,715, filed Oct. 9, 1980).

In producing permselective membranes from polymers, it has generally been necessary to dissolve the polymers in a water-soluble polar organic solvent to thereby prepare a dope. In many cases, aprotic basic polar organic solvents, such as N-methylpyrrolidone, dimethyl sulfoxide and dimethylformamide, have been used as such organic solvents.

To produce high molecular weight polyquinazolone-based polymers capable of being used to form films by polymerizing a bisoxazinone and a diamine as described hereinafter, the only method known is one wherein a sparingly water-soluble and protonic acidic polar organic solvent, such as cresol and chlorophenol, is used as a polymerization solvent (see, for example, *Kogyo Kagaku Zashi*, 73, 1239 (1970)). In this method, however, if a water-soluble polar organic solvent, such as N-methylpyrrolidone, is used as the polymerization solvent, the rate of polymerization is extremely low and only low molecular weight polymers having an inherent viscosity of about 0.3 or less are obtained even if the polymerization time is increased (see, for example, *Kobunshi Ronbun Shu*, 35, 369 (1978)). These low molecular weight polymers cannot be used to form films, or even if they can be formed into a film, the film thus-formed is very brittle and has low mechanical strength. Thus, permselective membranes which are practically usable cannot be prepared using such low molecular weight polymers.

Additionally, a method to prepare polyquinazolone from a diacylated aromatic diaminodicarboxylic acid and a diamine is known (see U.S. Pat. No. 3,444,136). This method, however, is different from the method of this invention described hereinafter wherein polyquinazolone-based polymers are prepared from a bisoxazinone and a diamine.

It is also known that on polymerization of a bisoxazinone and an aliphatic diamine in N-methylpyrrolidone, relatively high molecular weight polymers result. These polymers, however, are polyamides (see *J. Polymer Sci., Polymer Chem. ed.*, 17, 1163 (1979)).

Therefore, in preparing permselective membranes made of polyquinazolone-based polymers, a complicated method has heretofore been employed which comprises polymerizing a bisoxazinone and a diamine in a sparingly water-soluble organic solvent, such as cresol, to provide a polymer solution, adding a non-solvent for the polymer to the polymer solution thus-formed to precipitate the polymer, isolating the precipitated polymer, and then dissolving the polymer in a water-soluble polar organic solvent, such as N-methylpyrrolidone, to prepare a dope. This complicated method is very disadvantageous in the commercial production of permselective membranes. In other words, if high molecular weight polyquinazolone-based polymers with film-forming capability can be prepared using a water-soluble and aprotic polar basic organic solvent, which is a dope solvent, as a polymerization solvent, the dope can be prepared using the polymerization solvent as it is, which is very advantageous in the commercial production of permselective membranes made of polyquinazolones.

SUMMARY OF THE INVENTION

As a result of extensive studies on the polymerization reaction of a bisoxazinone and a diamine, it has been found that:

(1) The use of a Lewis acid as a polymerization catalyst permits formation of high molecular weight polyquinazolone-based polymers in a water-soluble and aprotic polar organic solvent; and (2) When the diamine has a carboxylic acid group, a sulfonic acid group or a metal salt group thereof as a substituent, the diamine per se acts as a polymerization catalyst and undergoes prompt polymerization with bisoxazinone in the above-described aprotic polar organic solvent, in particular, without the use of a Lewis acid catalyst, providing high molecular weight polyquinazolone-based polymers.

Accordingly, the invention, in one embodiment, provides a process for producing polyquinazolone-based polymers containing, as a repeating unit, a bisquinazolone unit represented by formula (IIIa):

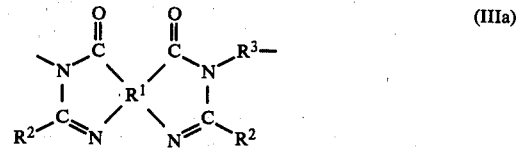

wherein $R^1$ is a tetravalent aromatic group; each $R^2$ is independently an alkyl group or an aromatic group; and $R^3$ is a divalent organic group; which comprises polymerizing a bisoxazinone represented by formula (I):

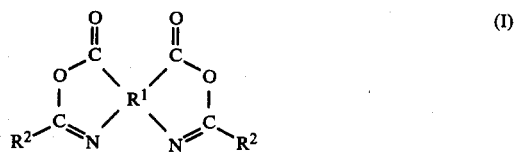

wherein $R^1$ and $R^2$ are the same as described above; and a diamine represented by formula (IIa):

$$H_2N-R^3-NH_2 \tag{IIa}$$

wherein $R^3$ is the same as described above; in an aprotic polar organic solvent in the presence of a Lewis acid.

In another embodiment, this invention provides a process for producing polyquinazolone-based polymers containing, as repeating units, a bisquinazolone unit represented by formula (IIIa) as described above and a bisquinazolone unit represented by formula (IIIb):

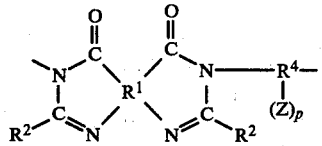

wherein $R^1$ is a tetravalent aromatic group; each $R^2$ is independently an alkyl group or an aromatic group; $R^4$ is a (p+2)-valent aromatic group; each Z is independently a group of the formula —COOH or —SO₃H or a metal salt of such a group; and p is an integer of 1 to 4; which comprises polymerizing a bisoxazinone represented by formula (I) as described above, a diamine represented by formula (IIa) as described above, and a diamine represented by formula (IIb):

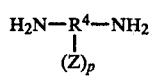

wherein $R^4$, Z and p are the same as described above, in an aprotic polar organic solvent in the presence of a phosphorus-containing dehydrating agent.

DETAILED DESCRIPTION OF THE INVENTION $R^1$ is a tetravalent aromatic group such as an aromatic diaminodicarboxylic acid residue having 6 to 15 carbon atoms and suitable examples of such tetravalent aromatic groups are given below:

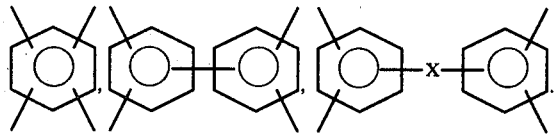

X is a divalent organic bonding group which bonds two divalent aromatic groups to form a tetravalent aromatic group. Examples of such groups are given below:

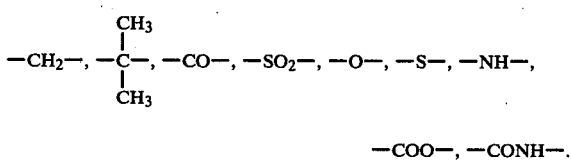

$R^2$ is an alkyl group or an aromatic group. Of these groups, an alkyl group containing 1 to 4 carbon atoms, such as methyl, ethyl, n-propyl and n-butyl groups, is preferred, and a methyl group or a phenyl group is particularly preferred.

Preferred bisoxazinones of the formula (I) are shown below:

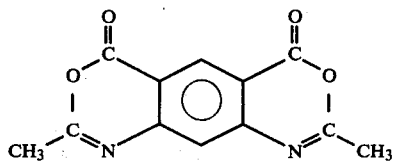

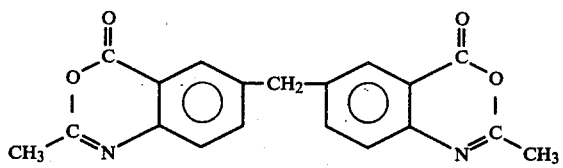

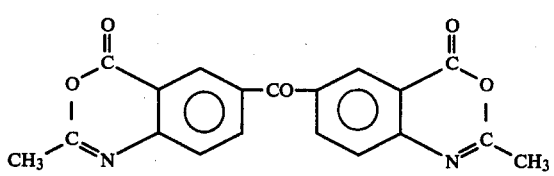

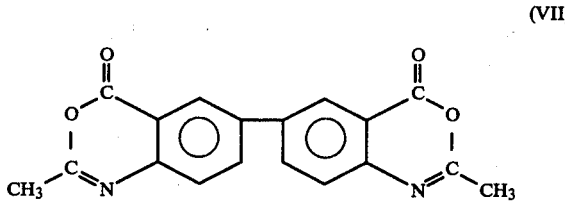

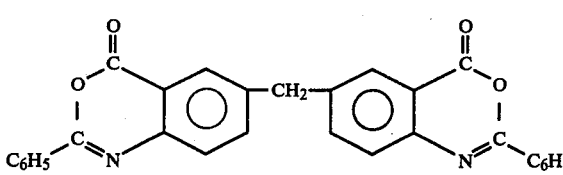

$R^3$ is a divalent organic group, more specifically, a divalent aromatic, aliphatic or alicyclic organic group, or a divalent organic group wherein the foregoing aromatic, aliphatic or alicyclic groups are linked together through an organic bonding group Y. $R^3$ has preferably 6 to 18 carbon atoms and suitable examples are arylene group and alkylene group. An aromatic group is particularly preferred, and suitable examples for the aromatic group are given below.

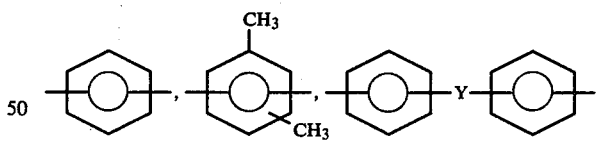

Examples of organic bonding groups represented by Y are as follows:

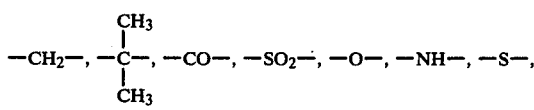

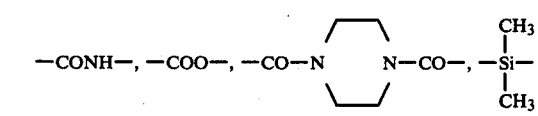

Suitable examples of diamines represented by formula (IIa) include m-phenylenediamine, p-phenylenediamine, 4,4'-diaminodiphenylmethane, 4,4'-diaminodiphenyl ether, 3,4'-diaminodiphenyl ether, 4,4'-diaminodiphenylsulfide, 4,4'-diaminodiphenylsulfone, p-bis(4-aminophenoxy)benzene, m-bis(4-aminophenoxy)benzene, N,N'-piperazinebis(p-aminobenzamide), m-xylylenediamine, p-xylylenediamine, bis(4-aminocyclohexyl)methane, hexamethylenediamine, heptamethylenediamine, octamethylenediamine, 1,4-diaminocyclohexane, bis(4-aminophenyl)diethylsilane and the like. These diamines can be used alone or in combination with each other.

In formula (IIb), $R^4$, Z and p are the same as described hereinbefore. Preferred examples of $R^4$ are given below:

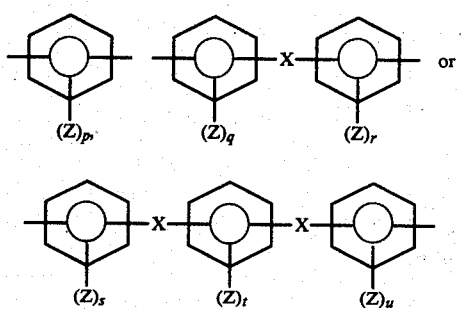

wherein q, r, s, t and u are each an integer of 0 to 4, q+r=p, and s+t+u=p, and X is the same as described above.

Particularly preferred examples of $R^4$ are represented by the formulae given below and their metal salts.

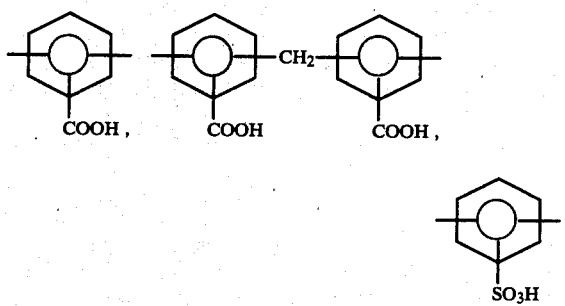

Suitable examples of such metal salts are alkali metal salts, for example, a lithium salt, a potassium salt and a sodium salt.

Benzene ring for $R^1$, $R^2$, $R^3$ and $R^4$ may be substituted with substituents which do not participate to the reaction, such as an alkyl group (e.g., methyl group), an alkoxy group (e.g., methoxy group) or a halogen atom (e.g., chlorine atom).

Preferred examples of diamines represented by formula (IIb) include 3,5-diaminobenzoic acid, 4,4'-diaminodiphenylmethane-3,3'-dicarboxylic acid, 3,5-diaminobenzenesulfonic acid, 3,3'-benzidinedicarboxylic acid, N,N'-bis(p-aminobenzoyl)-3,5-diaminobenzoic acid, isophthal-3-amino-5-carboxyanilide, and 4,4'-diaminodiphenylmethane-3,3'-disulfonic acid. These diamines of the formula (IIb) can be used alone or in combination with each other.

In accordance with the process of the invention, nearly equimolar amounts of the bisoxazinone and the diamine are reacted by heating in an aprotic polar organic solvent.

As described hereinbefore, even though the bisoxazinone and the diamine of formula (IIa) are reacted in an aprotic organic solvent, no high molecular weight polymer can be obtained. On the other hand, when a Lewis acid catalyst is used in accordance with the process of the invention, the polymerization proceeds smoothly and high molecular weight polyquinazolone-based polymers can be obtained.

Suitable examples of Lewis acid catalysts which can be used include metal halides such as anhydrous stannous chloride, anhydrous cupric chloride, anhydrous cobalt chloride, anhydrous ferric chloride and anhydrous nickel chloride. Of these compounds, the chlorides are particularly suitable. The amount of the Lewis acid catalyst which can be used is about 0.002 to 0.2 mol, preferably about 0.01 to 0.1 mol, per mol of the bisoxazinone or the diamine. If the amount of the Lewis acid catalyst is too large, i.e., more than about 0.2 mol, gelation occurs. If the amount of the Lewis acid catalyst is too small, the rate of polymerization is slow, and if polymerization is continued for a long period of time, e.g., several tens hours, rigid high molecular weight polyquinazolone having film forming property cannot be obtained.

Part of the diamine represented by formula (IIa) may be replaced with the diamine represented by formula (IIb). As described hereinafter, however, if the diamine of formula (IIa) is replaced with a large amount of the diamine of formula (IIb), gelation will occur as in the case where an excessive amount of the Lewis acid catalyst is used because the diamine of formula (IIb) itself acts as a catalyst for the polymerization with the bisoxazinone. Thus, when the bisoxazinone, the diamine of formula (IIa) and the diamine of formula (IIb) are polymerized in the presence of the Lewis acid catalyst alone, it is preferred that the amount of the diamine of formula (IIb) be less than about 10 mol% of the total amount of both diamines so as to avoid gelation.

In accordance with the invention, however, the gelation can be effectively prevented by using a phosphorus-containing dehydrating agent in combination. Examples of such phosphorus-containing dehydrating agents include phosphorus pentoxide, phosphoric acid, metaphosphoric acid, phosphorous acid, hypophosphoric acid, pyrophosphoric acid and polyphosphoric acid. Of these compounds, phosphorus pentoxide is preferred. The amount of the dehydrating agent used is about 0.001 to 0.4 mol, preferably about 0.01 to 0.2 mol, per mol of the bisoxazinone.

The diamine of formula (IIb) containing an acidic group acts as a catalyst for the polymerization of the bisoxazinone and the diamine. Therefore, when at least a part of the diamine component is the diamine of formula (IIb), high molecular weight polyquinazolone-based polymers can be formed without the use of the Lewis acid catalyst. The catalytic action of the diamine of formula (IIb) is markedly exhibited when it constitutes about 10 mol% or more of the diamine component. Of course, the Lewis acid catalyst can be used when the diamine component contains the diamine of formula (IIb). In particular, when the diamine of formula (IIb) constitutes less than about 10 mol% of the diamine component, it is desirable to use the Lewis acid catalyst in combination with the dehydrating agent.

In the polymerization of the bisoxazinone and the diamines of formulae (IIa) and (IIb) wherein the diamine of formula (IIb) constitutes about 10 mol% or more of the diamine component, by adding the dehydrating agent in an amount of about 0.001 to 0.4 mol, preferably about 0.01 to 0.2 mol, per mol of the bisoxazinone, high molecular weight polyquinazolone-based polymers having, as a repeating unit, bisquinazolone units represented by formulae (IIIa) and (IIIb) can be formed. If desired, the Lewis acid catalyst may be added with the dehydrating agent in an amount of 0 to about 0.2 mol, preferably about 0.002 to 0.1 mol, of the Lewis acid catalyst per mol of the bisoxazinone.

The maximum amount of the diamine of the formula (IIb) which can be replaced with the diamine of the formula (IIa) is about 60 mol%. If the amount is more than 60 mol%, gelation tends to occur.

The polymerization solvent as used herein is an aprotic polar organic solvent. Examples of such aprotic organic solvents include N-methylpyrrolidone, dimethylacetamide, dimethylformamide and dimethyl sulfoxide. There is no specific limitation to the amount of the solvent to be used. Usually, the solvent is used in such an amount that the total weight of the bisoxazinone and the diamine component constitutes about 10 to 50% by weight, preferably about 20 to 30% by weight, of the resulting solution.

In the process of the invention, it is preferred for a hydrocarbon solvent capable of forming an azeotropic mixture with water, for example, benzene, xylene and toluene, be employed also and the polymerization be carried out while distilling off the water formed by the polymerization as an azeotropic mixture. The polymerization temperature is from about 150° C. to about 200° C., and the polymerization time is from about several hours to several ten hours and a usually sufficient time is within about 100 hours. The hydrocarbon solvent can be present in an amount of from about 5 to 30% by weight based on the total weight of the polymerization solvent and the hydrocarbon solvent.

In the preparation of the polyquinazolone-based polymer by the polymerization of the bisoxazinone and the diamine of formula (IIa) in the aprotic polar organic solvent (e.g., N-methylpyrrolidone) as a polymerization solvent, the use of the Lewis acid, preferably in combination with the phosphorus-containing dehydrating agent, permits the polymerization to proceed smoothly without gelation and to provide the polyquinazolone-based polymer capable of forming a tough film. Furthermore, when the diamine of formula (IIb) (containing an acidic group) is used as the diamine component, the polymerization reaction proceeds smoothly in the presence of the phosphorus-containing dehydrating agent without the use of the Lewis acid catalyst because the diamine of formula (IIb) has a catalytic action, and a high molecular weight polyquinazolone-based polymer can be obtained.

The polyquinazolone-based polymer prepared by the process of the invention has an inherent viscosity of about 0.4 or more, preferably about 1.0 or more. The polymer solution after the polymerization reaction can be appropriately diluted or concentrated, if desired, or can be used as it is as a dope for use in the production of permselective membranes. Thus, the polyquinazolone-based polymer of the invention is very useful for the commercial production of permselective membranes.

Permselective membranes can easily be prepared from the polyquinazolone-based polymers according to the present invention by conventional phase-inversion method as described in, for example, H. Strathman et al., *Desalination*, 21, 241 (1977) and M. A. Kaus et al., *J. Appl. Polymer Sci.*, 23, 445 (1979).

The following Examples and Reference Examples of preparation of a permselective membrane from a polymer solution are given to illustrate the invention in greater detail. However, the invention is not to be construed as being limited to these examples. Unless otherwise indicated, all parts, percents, ratios and the like are by weight.

EXAMPLE 1

A flask equipped with a stirrer, a nitrogen gas inlet, a reflux condenser with an apparatus through which water formed could be withdrawn, and jacket bath which could be heated to 250° C. was charged with 74.8 g of N-methyl-2-pyrrolidone (NMP), and 60 mg (0.0003 mol) of anhydrous stannous chloride, as a polymerization catalyst, was added and dissolved therein. Then, 20.1 g (0.06 mol) of bisoxazinone of the formula (V) as described hereinbefore and 12.0 g (0.06 mol) of 4,4'-diaminodiphenyl ether were added and dissolved therein, and furthermore 15 g of xylene as an azeotropic solvent was added.

The xylene was refluxed in a stream of nitrogen by heating to a temperature of from 165° C. to 200° C., and while continuously azeotropically distilling off the water formed, polymerization was carried out. Thirty hours after the start of the polymerization, 15 g of NMP was added to dilute the reaction mixture, and the diluted reaction mixture was polymerized for an additional 20 hours. The xylene was distilled off, and an NMP solution of a polyquinazolone-based polymer having a solid content of 25% by weight and a solution viscosity of 210 poises was obtained. The inherent viscosity of the polymer was 0.60.

EXAMPLE 2

A flask equipped with a stirrer, a nitrogen gas inlet, a condenser with an apparatus through which the water formed could be withdrawn, and a jacket bath which could be heated to 250° C. was charged with 74.8 g of NMP, and 600 mg (0.003 mol) of anhydrous stannous chloride as a polymerization catalyst and furthermore 426 mg (0.003 mol) of phosphorus pentoxide was added and dissolved therein. Then, 20.1 g (0.06 mol) of bisoxazinone of the formula (V) and 12.0 g (0.06 mol) of 4,4'-diaminodiphenyl ether were added and dissolved, and furthermore 15 g of xylene was added as an azeotropic solvent.

The xylene was refluxed in a stream of nitrogen by heating to a temperature of from 165° C. to 200° C., and while continuously azeotropically distilling off the water formed, polymerization was carried out. Ten hours after the start of the polymerization, 15 g of NMP was added to dilute the reaction mixture, and the polymerization was continued for an additional 32 hours. The xylene was distilled off, and a viscous NMP solution of a polyquinazolone-based polymer having a solid content of 25% by weight and a solution viscosity of 300 poises was obtained. The inherent viscosity of the polymer was 0.85.

EXAMPLE 3

The procedure of Example 2 was repeated except that 11.9 g (0.06 mol) of 4,4'-diaminodiphenylmethane was used in place of the 4,4'-diaminodiphenyl ether and 97 mg (0.0006 mol) of anhydrous ferric chloride was used in place of the stannous chloride as the catalyst, to thereby obtain a polyquinazolone-based polymer having an inherent viscosity of 0.75.

EXAMPLE 4

The procedure of Example 2 was repeated except that a mixture of 9.61 g (0.048 mol) of 4,4'-diaminodiphenyl ether and 3.89 g (0.012 mol) of piperazinebis(p-aminobenzoic acid amide) was used in place of 4,4'-diaminodiphenyl ether and 389 mg of anhydrous nickel chloride was used as the catalyst, to thereby obtain a polyquinazolone-based polymer having an inherent viscosity of 0.58.

EXAMPLE 5

A flask equipped with a stirrer, a nitrogen gas inlet, a reflux condenser with an apparatus through which the water formed could be withdrawn, and a jacket bath which could be heated to 250° C. was charged with 93 g of NMP, and 240 mg (0.0012 mol) of anhydrous stannous chloride was dissolved therein as a polymerization catalyst. Furthermore, 426 mg (0.003 mol) of phosphorus pentoxide, 20.1 g (0.06 mol) of bisoxazinone having the formula (V), 11.41 g (0.057 mol) of 4,4'-diaminodiphenyl ether and 0.86 g (0.003 mol) of 4,4'-diaminodiphenylmethane-3,3'-dicarboxylic acid were dissolved therein, and 15 g of xylene was added thereto. The polymerization was carried out for 19 hours at a temperature of from 165° C. to 200° C. After distilling off the xylene, a polymer solution having a solid content of 25% and a solution viscosity of 270 poises was obtained. The inherent viscosity of the polymer was 0.67.

EXAMPLE 6

In the same manner as in Example 5, 426 mg (0.003 mol) of phosphorus pentoxide, 20.1 g (0.06 mol) of bisoxazinone having the formula (V), 9.61 g (0.048 mol) of 4,4'-diaminodiphenyl ether, and 3.44 g (0.012 mol) of 4,4'-diaminodiphenylmethane-3,3'-dicarboxylic acid were dissolved in 93 g of NMP, 15 g of xylene was added, and the polymerization was carried out for 13 hours at a temperature of from 165° C. to 200° C. After distilling off the xylene, a viscous NMP solution of a polyquinazolone-based polymer having a solid content of 25% and a solution viscosity of 720 poises was obtained. The inherent viscosity of the polymer was 1.1.

EXAMPLE 7

In the same manner as in Example 6, 20.1 g (0.06 mol) of bisoxazinone having the formula (V) was polymerized with 8.41 g (0.042 mol) of 4,4'-diaminodiphenyl ether and 2.74 g (0.018 mol) of 3,5-diaminobenzoic acid in the presence of 230 mg (0.0012 mol) of anhydrous stannous chloride and 426 mg (0.003 mol) of phosphorus pentoxide for 25 hours to prepare a polymer solution having a solution viscosity of 450 poises. The inherent viscosity of the polymer was 0.70.

EXAMPLE 8

In the same manner as in Example 6, 20.1 g (0.06 mol) of a bisoxazinone having the formula (V) was polymerized with 10.81 g (0.054 mol) of 4,4'-diaminodiphenyl ether and 0.94 g (0.006 mol) of 3,5-diaminobenzenesulfonic acid in the presence of 97 mg (0.0006 mol) of anhydrous ferric chloride and 426 mg (0.003 mol) of phosphorus pentoxide for 38 hours to prepare a polymer solution having a solution viscosity of 380 poises. The inherent viscosity of the polymer was 0.61.

REFERENCE EXAMPLE 1

Three grams of lithium chloride was dissolved in 22 g of dimethylformamide and added to 50 g of the NMP solution of polyquinazolone-based polymer obtained in Example 2. The resulting mixture was stirred at 80° C. for 5 hours to form a uniform dope. The thus-formed dope was defoamed, coated on a glass plate in a thickness of 360μ, maintained horizontally in an atmosphere at 25° C. and 65% relative humidity for 30 seconds, placed in cold water maintained at 0° C. and held therein to form a permselective membrane having a film thickness of 205μ.

The membrane thus-formed was attached to a batch type measuring cell, and a 0.5% aqueous solution of polyethylene glycol having an average molecular weight of 20,000 was fed thereto at conditions of 25° C. and 4 kg/cm$^2$ to measure the rejection of polyethylene glycol and the water flux. The rejection of polyethylene glycol and the water flux were 91% and 1.95 m$^3$/m$^2$·day, respectively.

REFERENCE EXAMPLE 2

Three grams of lithium chloride was dissolved in 22 g of dimethylformamide, and then added to 50 g of the NMP solution of polyquinazolone-based polymer obtained in Example 6. The resulting mixture was stirred at 80° C. for 5 hours to form a uniform dope. The thus-formed dope was defoamed, coated on a glass plate in a thickness of 360μ, placed for 4 minutes in a circulating hot air oven maintained at 130° C. to evaporate part of the solvent from the surface of the dope, placed in cold water maintained at 0° C., and held therein for 5 hours to form a permselective membrane having a film thickness of 140μ.

The film thus-formed was attached to a batch type measuring cell, and a 0.5% aqueous solution of sodium chloride was fed thereto at conditions of 25° C. and 42 kg/cm$^2$ to measure the rejection of sodium chloride and the water flux. The rejection of sodium chloride and the water flux were 97.8% and 0.51 m$^3$/m$^2$·day, respectively.

While the invention has been described in detail and with reference to specific embodiments thereof, it will be apparent to one skilled in the art that various changes and modifications can be made therein without departing from the spirit and scope thereof.

What is claimed is:

1. A process for producing a polyquinazolone-based polymer having, as a repeating unit, a bisquinazolone unit represented by formula (IIIa):

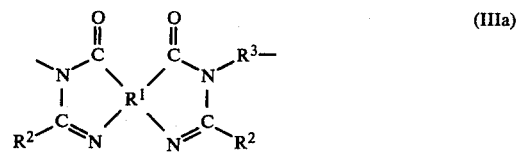

(IIIa)

wherein $R^1$ is a tetravalent aromatic group; $R^2$ is independently an alkyl group or an aromatic group; and $R^3$ is a divalent organic group; which comprises polymerizing nearly equimolar amounts of (a) a bisoxazinone represented by formula (I):

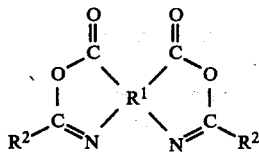 (I)

wherein $R^1$ and $R^2$ are the same as described above, and (b) a diamine represented by formula (IIa):

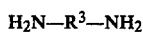 (IIa)

wherein $R^3$ is the same as described above, in an aprotic polar organic solvent in the presence of a Lewis acid catalyst.

2. The process as claimed in claim 1, wherein the Lewis acid catalyst is a metal halide.

3. The process as claimed in claim 2, wherein the Lewis acid is at least one metal halide selected from the group consisting of stannous chloride, cupric chloride, cobalt chloride, ferric chloride and nickel chloride.

4. The process as claimed in claim 1, wherein the amount of the Lewis acid catalyst is about 0.002 to 0.2 mol per mol of the bisoxazinone (a).

5. The process as claimed in claim 1, wherein less than about 10 mol% of the diamine of formula (IIa) is replaced by a diamine represented by formula (IIb):

 (IIb)

wherein $R^4$ is a (p+2)-valent aromatic group, Z is independently a group of the formula —COOH or —SO$_3$H or a metal salt thereof, and p is an integer of from 1 to 4.

6. The process as claimed in claim 1 or 5, wherein the bisoxazinone (a) and the diamine (b) are polymerized in the presence of a phosphorus-containing dehydrating agent.

7. The process as claimed in claim 6, wherein the phosphorus-containing dehydrating agent is phosphorus pentoxide.

8. The process as claimed in claim 6, wherein the amount of the phosphorus-containing dehydrating agent is about 0.001 to 0.4 mol per mol of the bisoxazinone (a).

9. A process for producing a polyquinazolone-based polymer having, as repeating units, a bisquinazolone unit represented by formula (IIIa):

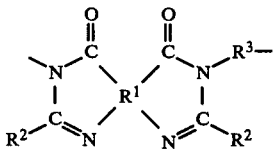 (IIIa)

wherein $R^1$ is a tetravalent aromatic group; $R^2$ is independently an alkyl group or an aromatic group; and $R^3$ is a divalent organic group; and a bisquinazolone unit represented by formula (IIIb):

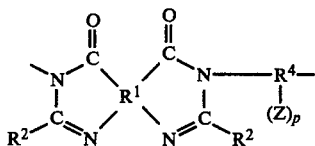 (IIIb)

wherein $R^1$ and $R^2$ are the same as described above; $R^4$ is a (p+2)-valent aromatic group; Z is independently a group of the formula —COOH or —SO$_3$H or a metal salt thereof; and p is an integer of from 1 to 4; which comprises reacting nearly equimolar amounts of (a) a bisoxazinone represented by formula (I):

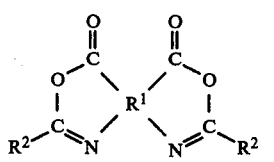 (I)

wherein $R^1$ and $R^2$ are the same as described above; and (b) a diamine component consisting of a diamine represented by formula (IIa):

 (IIa)

wherein $R^3$ is the same as described above, and a diamine represented by formula (IIb):

 (IIb)

wherein $R^4$, Z and p are the same as described above, in an aprotic polar organic solvent in the presence of a phosphorus-containing dehydrating agent.

10. The process as claimed in claim 9, wherein the diamine of formula (IIb) is about 10 mol% or more of the total amount of the diamine component (b).

11. The process as claimed in claim 9, wherein the phosphorus-containing dehydrating agent is phosphorus pentoxide.

12. The process as claimed in claim 9, wherein the amount of the phosphorus-containing dehydrating agent is about 0.001 to 0.4 mol per mol of the bisoxazinone (a).

13. The process as claimed in claim 9, wherein the bisoxazinone (a) and the diamine component (b) are polymerized in the presence of a Lewis acid catalyst.

14. The process as claimed in claim 13, wherein the Lewis acid catalyst is a metal halide.

15. The process as claimed in claim 14, wherein the Lewis acid catalyst is at least one metal halide selected from the group consisting of stannous chloride, cupric chloride, cobalt chloride, ferric chloride and nickel chloride.

16. The process as claimed in claim 13, wherein the amount of the Lewis acid catalyst is about 0.002 to 0.2 mol per mol of the bisoxazinone (a).

* * * * *